US008917026B2

(12) United States Patent
Ferrier

(10) Patent No.: US 8,917,026 B2
(45) Date of Patent: Dec. 23, 2014

(54) LINEAR BYPASS ELECTRICAL CIRCUIT FOR DRIVING LED STRINGS

(71) Applicant: Lumenetix, Inc., Scotts Valley, CA (US)

(72) Inventor: Herman Ferrier, Scotts Valley, CA (US)

(73) Assignee: Lumenetix, Inc., Scotts Valley, CA (US)

( * ) Notice: Subject to any disclaimer, the term of this patent is extended or adjusted under 35 U.S.C. 154(b) by 8 days.

(21) Appl. No.: 13/717,594

(22) Filed: Dec. 17, 2012

(65) Prior Publication Data

US 2013/0207559 A1   Aug. 15, 2013

Related U.S. Application Data

(60) Provisional application No. 61/577,842, filed on Dec. 20, 2011.

(51) Int. Cl.
| H05B 37/00 | (2006.01) |
| H05B 39/00 | (2006.01) |
| H05B 41/00 | (2006.01) |
| H05B 33/08 | (2006.01) |

(52) U.S. Cl.
CPC .......... *H05B 33/0812* (2013.01); *H05B 33/083* (2013.01)
USPC ........... 315/192; 315/119; 315/123; 315/128; 315/185 R; 315/193

(58) Field of Classification Search
USPC ...................................... 315/185 R, 192–193
See application file for complete search history.

(56) References Cited

U.S. PATENT DOCUMENTS

| 6,153,980 A | 11/2000 | Marshall et al. |
| 7,317,403 B2 | 1/2008 | Grootes et al. |
| 7,425,943 B2 | 9/2008 | Furukawa |

(Continued)

FOREIGN PATENT DOCUMENTS

| JP | 2001051638 A | 2/2001 |
| JP | 2004235046 A | 8/2004 |

(Continued)

OTHER PUBLICATIONS

Co-Pending U.S. Appl. No. 12/370,545 by Weaver, et al., filed Feb. 12, 2009.

(Continued)

*Primary Examiner* — Anh Tran
(74) *Attorney, Agent, or Firm* — Perkins Coie LLP

(57) ABSTRACT

An electrical circuit is described that comprises a first string and second LED string coupled in parallel, a first and second transistor, at least one bypass transistor, and a controller. The first transistor is coupled to the first LED string at a first terminal of the first transistor. The second LED string includes multiple LED color strings coupled in series. The second transistor is coupled to the second LED string at a first terminal of the second transistor. The bypass transistor is coupled to one of the color strings. A first terminal of the bypass transistor is coupled to a first terminal of the color string. The second terminal of the bypass transistor is coupled to a second terminal of the color string. The controller controls a gate voltage of the first and second transistors and the bypass transistor to operate all transistors in linear modes.

47 Claims, 7 Drawing Sheets

(56) References Cited

U.S. PATENT DOCUMENTS

| | | |
|---|---|---|
| 7,468,723 B1 | 12/2008 | Collins |
| 7,649,326 B2 | 1/2010 | Johnson et al. |
| 7,663,598 B2 | 2/2010 | Kim |
| 7,688,002 B2 | 3/2010 | Ashdown et al. |
| 7,986,107 B2 | 7/2011 | Weaver et al. |
| 8,531,128 B2 | 9/2013 | Weaver et al. |
| 2007/0257623 A1 | 11/2007 | Johnson et al. |
| 2008/0122376 A1* | 5/2008 | Lys ............................... 315/192 |
| 2008/0191642 A1 | 8/2008 | Slot et al. |
| 2008/0303452 A1 | 12/2008 | Van Erp |
| 2009/0085489 A1* | 4/2009 | Chang et al. .................. 315/193 |
| 2010/0194274 A1 | 8/2010 | Hoogzaad |

FOREIGN PATENT DOCUMENTS

| | | |
|---|---|---|
| JP | 2005310997 A | 11/2005 |
| WO | WO-2006/107199 | 10/2006 |
| WO | WO-2008/139365 A1 | 11/2008 |

OTHER PUBLICATIONS

Co-Pending U.S. Appl. No. 13/162,501 by Weaver, et al., filed Jun. 16, 2011.

Co-Pending U.S. Appl. No. 13/815,897 by Weaver et al., filed Mar. 15, 2013.

Co-Pending U.S. Appl. No. 13/892,171 by Weaver, et al., filed May 10, 2013.

International Search Report and Written Opinion mailed May 28, 2009, for International Patent Application No. PCT/US09/001254 filed Feb. 27, 2009, pp. 1-10.

Non-Final Office Action mailed Dec. 8, 2010, in Co-Pending U.S. Appl. No. 12/370,545 of Weaver et al., filed Feb. 12, 2009.

Non-Final Office Action mailed May 11, 2012, in Co-Pending U.S. Appl. No. 13/162,501, of Weaver et al., filed Jun. 16, 2011, 8 pages.

Notice of Allowance, mailed Mar. 21, 2011, in Co-Pending U.S. Appl. No. 12/370,545 of Weaver et al., filed Feb. 12, 2009, 4 pages.

Notice of Allowance, mailed May 15, 2013, in Co-Pending U.S. Appl. No. 13/162,501, of Weaver et al., filed Jun. 16, 2011, 6 pages.

* cited by examiner

LINEAR BYPASS ELECTRICAL CIRCUIT FOR DRIVING LED STRINGS

CROSS-REFERENCES TO RELATED APPLICATIONS

This application claims the benefit of U.S. Provisional Application No. 61/577,842, entitled "LINEAR BYPASS ELECTRICAL CIRCUIT FOR DRIVING LED STRINGS", filed Dec. 20, 2011, and is hereby incorporated by reference in its entirety.

This application is related to and incorporates by reference in its entirety U.S. patent application Ser. No. 12/782,038, entitled "LAMP COLOR MATCHING AND CONTROL SYSTEMS AND METHODS", filed May 18, 2010.

BACKGROUND

A light-emitting diode (LED) emits incoherent narrow-spectrum light when the diode is electrically biased in the forward direction of the p-n junction inside of the diode. LEDs typically have higher luminous efficacy, i.e. lumens per watt, than conventional light sources such as incandescent bulbs. LEDs are often used in battery powered or energy saving devices, and are becoming increasingly popular in higher power applications such as, for example, flashlights, area lighting, and regular household light sources.

Due to the emitting spectrum nature of the LEDs, the quality of the light is a primary consideration with the use of LEDs in higher-power applications. It is desirable to have high brightness white LED device that has better light quality, which is quantitatively measured by the color rendering index (CRI). The CRI is a measure of how true the light is as compared to an ideal or natural light source in representing the entire light spectrum. An ideal or natural light source has a high CRI of, for example, 100. Individual white LED typically has a poor CRI, in the approximate range of 70-80, because of their emitting spectral concentration. To partially remedy the problem, phosphors are utilized to convert the wavelength of the light emitted from the diode to other wavelength regions. Furthermore, LEDs with different emitting colors mixed to produce a white light better filling out the light spectrum. For example, combinations of white, amber, red, and green LEDs can provide light with CRIs at or above 90.

Combinations of LEDs having different emitting light colors may include multiple strings of LEDs having the same emitting light color. There are conventional approaches for modulating the light output from each string of LEDs having the same emitting light color. One approach is to provide a constant current source and turn the string of LEDs on and off over a particular duty cycle to change the perceived light intensity of that string. This is achieved by using switch-mode transistors switching on and off at a high frequency. The approaches are used not only to change the relative intensity of LEDs with different colors but also to raise and lower the overall intensity of the string in a manner similar to a dimming function. Although the approach provides the color control, it has significant efficiency penalties.

This approach uses a current source for each LED string and modulates the duty cycle of the LED string at a frequency imperceptible to the human eye. But, running the LEDs at their full current rating and duty cycling their outputs is typically less efficient than simply running the LEDs continuously at a lower current, because LED efficiency declines with increasing current.

Furthermore, the switching circuit introduces electromagnetic interference (EMI), whose disadvantage cannot be understated. To filter and screen the EMI, more components need to be taken into account, driving up the parts cost.

Moreover, the incandescence emission from a conventional incandescent light bulb is a black body radiation. Its emission spectrum conforms to the Planckian locus on the CIE color space. When dimming an incandescent light bulb, customers are used to the color temperature changing according to the black body radiation. Therefore, it is desirable to mimic the color temperature change conforming to the Planckian locus when dimming a light source. However, an LED barely shifts its emission spectrum when the pass-through current reduces. Therefore, when dimming a LED-based lighting fixture, a user does not observe the color shift as he is used to.

The foregoing examples of the related art and limitations related therewith are intended to be illustrative and not exclusive. Other limitations of the related art will become apparent upon a reading of the specification and a study of the drawings.

SUMMARY

Introduced herein is an electrical circuit for driving LED strings. The electrical circuit comprises a first and a second LED strings, a first and a second transistors, at least one bypass transistor, a power supply and a controller. The first LED string includes at least one LED. The first transistor is coupled to the first LED string at a first terminal of the first transistor. The first transistor is operating in a linear mode. The second LED string includes a plurality of color strings. Each of the color strings includes at least one LED. The color strings are coupled in series. The first LED string and the second LED string are coupled in parallel. The second transistor is coupled to the second LED string at a first terminal of the second transistor. The second transistor is operating in a linear mode. The bypass transistor is coupled to one of the color strings. The bypass transistor is operating in a linear mode. A first terminal of the bypass transistor is coupled to a first terminal of the color string. The second terminal of the bypass transistor is coupled to a second terminal of the color string. The power supply is configured to provide power to the first and second LED strings. The controller is coupled to the first transistor, the second transistor and the bypass transistor at gate terminals of the transistors to control gate voltages of the transistors so that the first transistor, the second transistor and the bypass transistor are operating in the linear modes.

The techniques introduced here minimize the electromagnetic interference (EMI), eliminate the need for inductors in the circuit, can operate from a standard TRIAC dimmable constant current power supply, optimize the power efficiency, and have built-in ability to adjust the intensity and the emitting light color characteristics, such as color temperature and color rendering index.

By controlling the current ratio between white and color LED strings, and bypassing some of the current from one or more color strings, the color temperature of the dimming output light can be fine-tuned to conform to the Planckian locus, mimicking the behavior of a conventional incandescent light bulb under dimming.

This Summary is provided to introduce a selection of concepts in a simplified form that are further described below in the Detailed Description. This Summary is not intended to identify key features or essential features of the claimed subject matter, not is it intended to be used to limit the scope of the claimed subject matter.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in this figure may be arbitrarily combined or divided into separate components.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Figure 1:
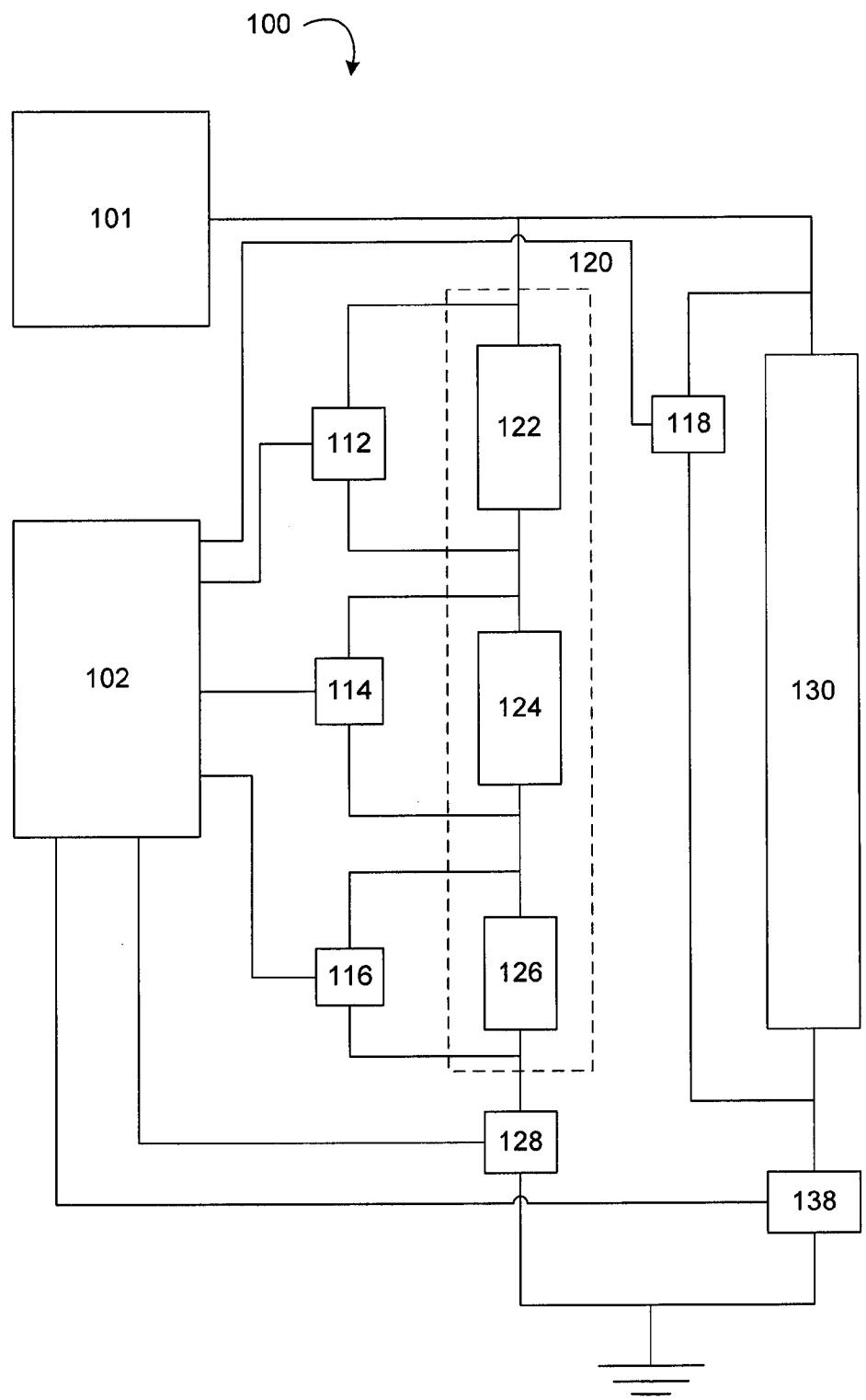
FIG. 1 depicts a block diagram of an electrical circuit for driving LED strings according to one embodiment.

FIG. 1 depicts a block diagram of electrical circuit 100 for driving LED strings according to one embodiment of the disclosure. The electrical circuit 100 includes an LED string 120. The LED string 120 includes one or more color strings, e.g., 122, 124 and 126 (collectively "color strings 122 through 126"). Each of the color string contains one or more LEDs. A linear mode transistor 128 is coupled directly to color string 126 in series. The electrical circuit 100 further includes an LED string 130 and a linear mode transistor 138 coupled in series. The LED string 130 contains one or more LEDs. As illustrated in FIG. 1, the series of 122-124-126-128 and the series of 130-138 are coupled in parallel. A power supply 101 is coupled to both LED string 130 and color string 122 to supply power to the LED string 130 and color strings 122, 124 and 126. As shown in FIG. 1, for each of the color strings 122, 124, 126, a bypass linear mode transistor (112, 114, 116) is coupled to the corresponding color string (122, 124, 126), respectively. As shown in FIG. 1, first and second terminals of each bypass linear mode transistor (112, 114, 116) are respectively coupled to the first and second terminals of each corresponding color string (122, 124, 126). A bypass linear mode transistor 118 is coupled to LED string 130 in parallel. The first and second terminals of bypass linear mode transistor 118 are respectively coupled to the first and second terminals of LED string 130. A bypass linear mode transistor is a linear mode transistor used to bypass a portion or all of the current from a load. Other embodiments may have fewer or more color strings and/or bypass linear mode transistors. A controller 102 is coupled to and is configured to control the linear mode transistors 128, 138 and bypass linear mode transistors 112, 114, 116, 118.

A linear mode transistor is an electrical regulator based on a transistor, such as a field effect transistor (FET), bipolar junction transistor (BJT), metal oxide semiconductor field effect transistor (MOSFET), or insulated gate bipolar transistor (IGBT), operating in its linear dissipative mode (also sometimes referred to as linear mode, linear region, triode mode, or ohmic mode). For example, the linear mode transistor may be a metal oxide semiconductor field effect transistor (MOSFET) operating in linear mode, i.e. the gate-source voltage is higher than the threshold voltage, and the drain-source voltage is higher than the difference between the gate-source voltage and the threshold voltage. In the linear mode, the transistor is turned on, and a channel has been created which allows current to flow between the drain and the source. The MOSFET operates like a resistor, controlled by the gate voltage relative to both the source and drain voltages. The relationship of the drain-source voltage and the drain current are relatively close to a linear form. A bypass linear mode transistor is a linear mode transistor used to bypass a portion or all of the current from a load. By controlling the gate voltage of the bypass linear mode transistor, the circuit can control how much current it wants to bypass from the load. A linear mode transistor is different than a switching transistor (also referred to as switch, or switcher) which is based on a transistor forced to act as an on/off switch (also referred to as saturation mode, or active mode).

There are two major types of transistors, bipolar transistors and field effect transistors. The terminals are labeled differently between these two types. A bipolar transistor has terminals labeled as base, collector, and emitter. A field effect transistor has terminals labeled as gate, source, and drain. For purposes of explanation, a transistor is commonly described herein as a field effect transistor; however, a transistor can also be any transistor including bipolar transistor. Similarly for purposes of explanation, a controlling terminal (also referred to as third terminal) of a transistor is commonly described herein as a gate terminal of a field effect transistor (a small current from base to emitter can control current between the collector and emitter terminals); however, a controlling terminal can also be a base terminal of a bipolar transistor (a voltage at the gate can control a current between source and drain). In this disclosure, a first or second terminal of the transistor means a source or drain terminal in case of a field effect transistor, or a collector or emitter terminal of a bipolar transistor.

In one embodiment, the power supply 101 is a DC power supply having a voltage output range and a current output range. During operation, power supply 101 provides power to LED string 130 and LED string 120, which includes color strings 122, 124, 126. In one embodiment, controller 102 is configured with an algorithm to control the linear mode transistors 112, 114, 116, 118, 128 and 138. In one embodiment, the algorithm for controlling the linear mode transistors 112, 114, 116, 118, 128, 138 can be based upon a brute force algorithm described in U.S. patent application Ser. No. 12/782,038, entitled "LAMP COLOR MATCHING AND CONTROL SYSTEMS AND METHODS", filed May 18, 2010, where the luminous flux output of each color string is adjusted incrementally but still retaining a constant total output luminous flux from all of the LED strings. Similarly, the currents sent to each color string by the controller 102 can be adjusted incrementally while still maintaining a constant total drive current supplied to all of the LED strings. Alternatively or additionally, an algorithm can be used by the controller 102 to control linear mode transistors 112, 114, 116, 118, 128, 138 to calibrate the LED strings' outputs. In one embodiment, the algorithm can also be based upon input received from a temperature monitor that measures the temperature near one or more of the LED strings.

In another embodiment, controller 102 may be a digital control circuit, an analog control circuit, or any circuit suitable for controlling the linear mode transistors. During operation, controller 102 executes the software to provide control signals to the linear mode transistors, which are thus controlled to route power provided by power supply 101 among the LEDs, as described further below.

Each of color strings 122, 124, 126 has at least one LED. In some embodiments, one or more of color strings 122, 124, 126 may have a plurality of LEDs. Thus, color strings 122, 124, 126 may have a different number of LEDs. In various embodiments, the LEDs of each of color strings 122, 124, 126 may be placed in various physical orientations. Additionally, in some embodiments the LEDs of color strings 122, 124, 126 may share a similar physical orientation. Furthermore, the LEDs of each of color strings 122, 124, 126 may be configured to emit light in various colors.

In some embodiments, the LEDs of each of color strings 122, 124, 126 are electrically coupled in series. In such embodiments, given that color strings 122, 124, 126 themselves are coupled in series as shown in FIG. 1 and described above, the LEDs of all of color strings 122 through 126 are coupled in series. Thus, in such embodiments, the LEDs of all of color strings 122, 124, 126 present a high string voltage drop that is the sum of their individual voltage drops. Power supply 101, providing power to color strings 122, 124, 126 as described above, may thus provide a similarly high supply voltage. In doing so, power supply 101 therefore exhibits higher efficiency. In some embodiments, some of the LEDs of one or more color strings are electrically coupled in parallel.

LED string 130 has at least one LED. In some embodiments, LED string 130 may have a plurality of LEDs. In some embodiments, the LEDs of LED string 130 may be configured to emit white light. In some embodiments, the LEDs of LED string 130 are electrically coupled in series. Thus, in such embodiments, the LEDs of LED string 130 present a string voltage drop that is the sum of their individual voltage drops. In some embodiments, the number of the LEDs of LED string 130 are arranged so that the total voltage drop of LED string 130 is substantially similar to the total voltage drop of LED string 120. Thus, two LED strings 120 and 130, coupled in parallel, have matched voltage drops to achieve better energy efficiency.

Figure 2:
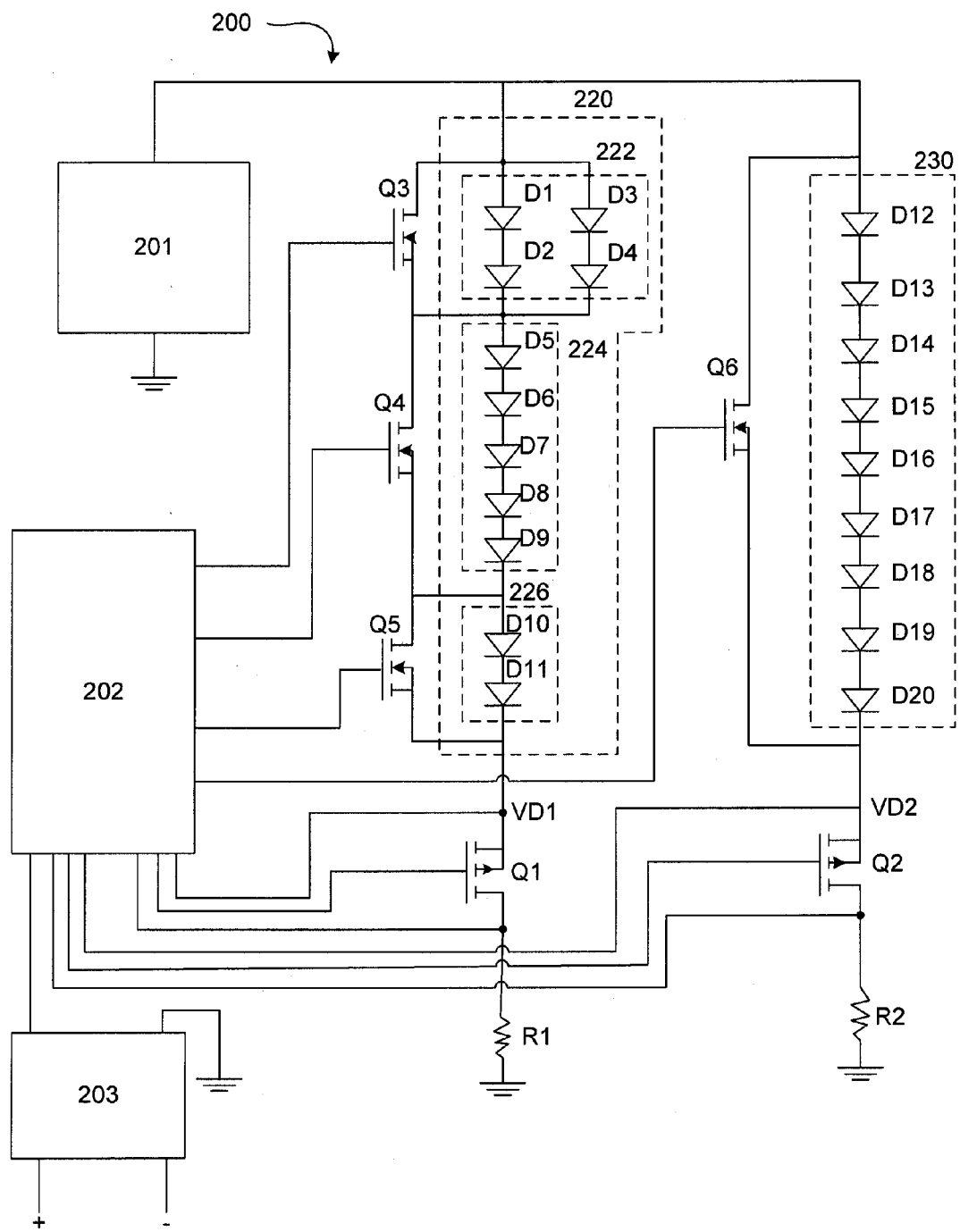
FIG. 2 depicts an electrical circuit for driving LED strings according to one embodiment.

FIG. 2 depicts electrical circuit 200 for driving LED strings according to one embodiment of the disclosure. The electrical circuit 200 includes LED strings 220 and 230. LED strings 220 and 230 are coupled in parallel. The LED string 220 includes multiple color strings 222, 224 and 226 coupled in series (collectively "color strings 222 through 226"). Each of the color string contains one or more LEDs. Color string 222 includes LEDs D1, D2, D3 and D4. LEDs D1 and D2 are coupled in series. LEDs D3 and D4 are coupled in series. The two series are coupled in parallel. Color string 224 includes LEDs D5, D6, D7, D8 and D9 coupled in series. Color string 226 includes LEDs D10 and D11 coupled in series. The color strings may contain LEDs emitting light having different colors. In one embodiment, LEDs D1, D2, D3 and D4 are red-emitting LEDs; LEDs D5, D6, D7, D8 and D9 are amber-emitting LEDs; while LEDs D10 and D11 are blue-emitting LEDs. LED string 230 includes LEDs D12, D13, D14, D15, D16, D17, D18, D19 and D20. In one embodiment, all LEDs in LED string 230 are white-emitting LEDs. In some embodiments, some of the LEDs may emit light having other colors, such as cyan.

A linear mode transistor Q1 is coupled directly to color string 226 in series. Another linear mode transistor Q2 is coupled directly to LED string 230 in series. A power supply 201 is coupled to both LED strings 220 and 230 to supply power to the LEDs. In one embodiment, the power supply 201 has a current output from 100 mA to 2 A, with a maximum voltage of 40 volts. In some embodiments, the power supply 201 is a constant current power supply. In some other embodiments, the power supply 201 is a TRIAC dimmable constant current power supply. As shown in FIG. 2, for each of the color strings 222, 224, 226, a bypass linear mode transistor (Q3, Q4, Q5) is coupled to the corresponding color string (222, 224, 226), respectively. The first and second terminals of each bypass linear mode transistor (Q3, Q4, Q5) are respectively coupled to the first and second terminals of corresponding color string (222, 224, 226). A bypass linear mode transistor Q6 is coupled to LED string 230. The first and second terminals of bypass linear mode transistor Q6 are respectively coupled to the first and second terminals of LED string 230. A bypass linear mode transistor is a linear mode transistor used to bypass a portion or all of the current from a load. A controller 202 is coupled to and is configured to control the linear mode transistors Q1, Q2 and bypass linear mode transistors Q3, Q4, Q5, Q6. The controller 202 may control the gate voltages of the linear mode transistors so that the linear mode transistors are operating in their linear modes. In one embodiment, controller 202 also measure the voltage drops across the linear mode transistor Q1 and Q2. As shown in FIG. 2, the controller 202 may also measure the voltages across the resistors R1 and R2, respectively. The voltages across resistors R1, R2 are proportional to the currents pass through LED strings 220 and 230, respectively. In one embodiment, the linear mode transistors Q1, Q2, Q3, Q4, Q5 and Q6 may be linear-mode transistors, such as a field effect transistor or bipolar junction transistor, in linear mode.

In one embodiment, the power supply 201 is a DC power supply having a voltage output range and a current output range. During operation, power supply 201 provides power to LED string 230 and LED string 220, which includes color strings 222, 224, 226. In one embodiment, controller 202 is configured with an algorithm to control the linear mode transistors Q1, Q2, Q3, Q4, Q5, Q6, such as the algorithms described above. In another embodiment, controller 202 may be a digital control circuit, an analog control circuit, or any circuit suitable for controlling the linear mode transistors. During operation, controller 202 executes the software to provide control signals to the linear mode transistors, which are thus controlled to route power provided by power supply 201 among the LEDs, as described further below.

The controller 202 may control the color temperature of output light by adjusting one or more bypass linear mode transistors. In one embodiment, the linear mode transistors Q3, Q4, Q5 and Q6 may be field effect transistors operating in the linear dissipative mode. The field effect transistors Q3-Q6 provide for dimming of the LED with various emitting colors to achieve the desired light color characteristics. For example, by adjusting Q3 to bypass more current from the red-emitting color string 220, the color temperature increases to make the light color appear cooler. Or by adjusting Q5 to bypass more current from the blue-emitting color string 226, the color temperature decreases to make the light color appear warmer. Or by independently adjusting Q3, Q4, Q5 and Q6 to regulate the spectrum contribution from LEDs having different emitting colors, the color rendering index (CRI) can be tuned.

The numbers and the arrangement of LEDs having various emitting colors are designed to emit an output light with a mid-range color temperature, when all bypass linear mode transistors Q3-Q6 are completely off. In one embodiment, the mid-range color temperature may be about 5000 Kelvin. In another embodiment, the mid-range color temperature may be about 4000 Kelvin. In yet another embodiment, the mid-range color temperature may be from about 3500 Kelvin to about 5500 Kelvin. The efficiency loss due to the dissipation on linear mode transistors is minimum in this case. When an output light of different color temperature is needed, one or more bypass linear mode transistor starts to turn partially on to dim corresponding LEDs.

Figure 6A:
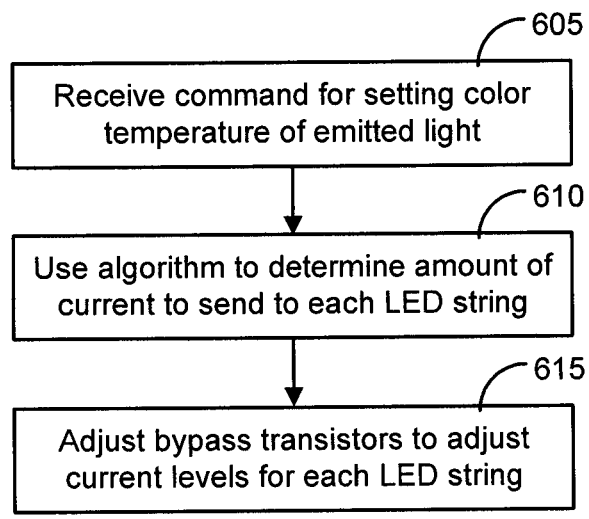
FIG. 6A depicts a flow diagram illustrating an example process of adjusting the bypass transistors in the electrical circuit.

FIG. 6A depicts a flow diagram illustrating an example process of adjusting the bypass transistors in the electrical circuit. At block 605, the system receives a command for setting the color temperature of the light emitted by the LED strings in the electrical circuit. The command includes a specific color temperature for the emitted light or a range of color temperatures.

Then at block 610, the controller references a pre-selected algorithm for determining the amount of current to send to each LED string for the specified color temperature (range). Next, at block 615 the controller adjusts the bypass transistors to adjust the current levels for each LED string.

Series of D1, D2 and series of D3, D4 are coupled in parallel, so that the total string voltage drop in LED string 220 is about 9 times of a single LED voltage drop. Since LED string 230 contains 9 LEDs in series, the total string voltage drop in LED string 230 is the sum of LEDs' individual voltage drops. So the total voltage drop in LED string 230 is also about 9 times of a single LED voltage drop. Thus, in such embodiments, the total string voltage drop of LED string 230 is substantially similar to the total string voltage drop of LED string 220. Thus, two LED strings 220 and 230, coupled in parallel, have relatively matched voltage drops to achieve better energy efficiency.

The voltage drop of individual LED varies among LEDs. Therefore, the total string voltage drop of LED string 220 may not be exactly the same as the voltage drop of LED string 230. If there is no controlling mechanism, the difference between the parallel loads will cause most of the current to pass through one of the LED strings having higher voltage drop. This will cause poor light output performance and even LED failure due to the excessive current. In one embodiment, the controller 202 controls the operations of Q1 and Q2 such that at least one of Q1 and Q2 is fully on for most of the time. This mode of operation leads to minimum power loss while providing current apportioning between the LED strings.

Figure 3:
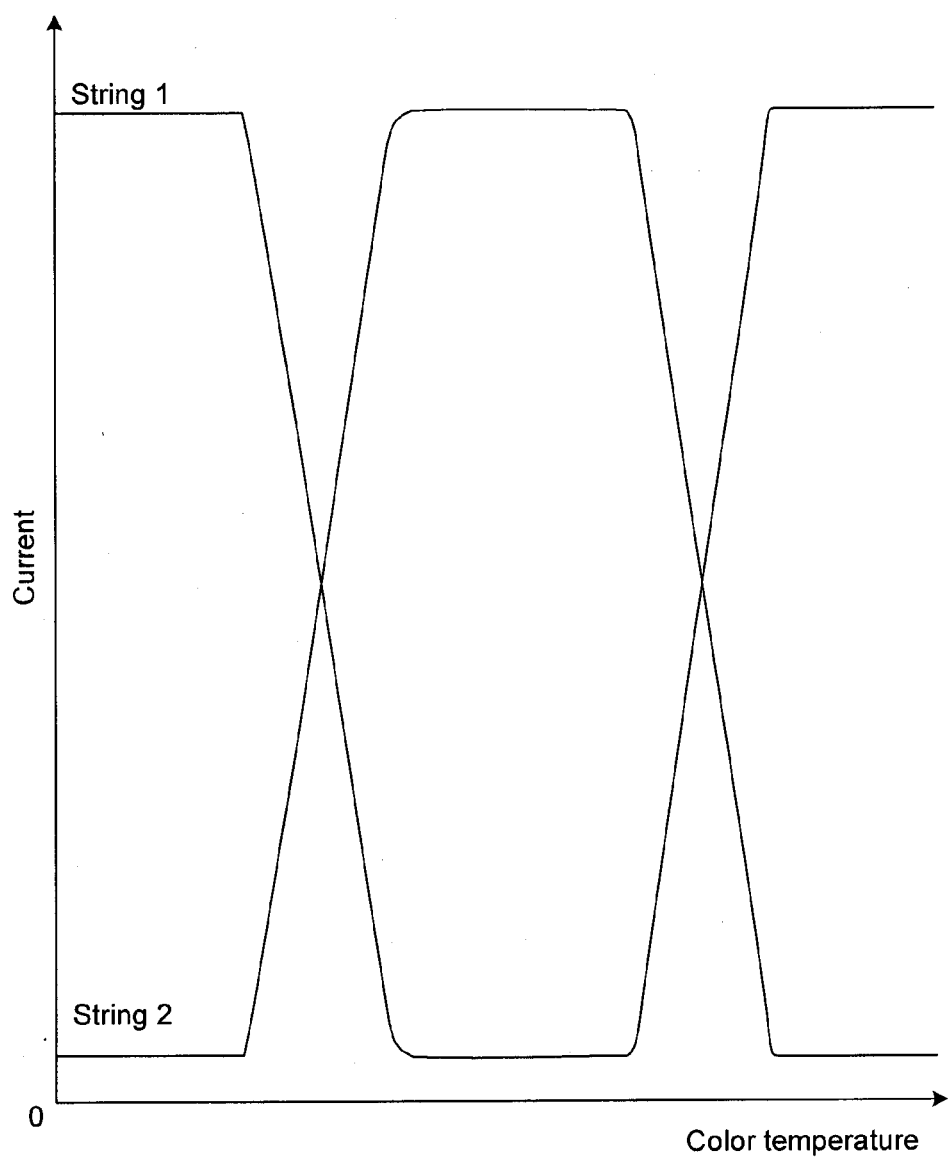
FIG. 3 is an example of wave forms of electric currents passing through LED strings according to one embodiment.

FIG. 3 shows the wave forms of electric currents passing through LED strings 220 and 230. It can be measured by the voltages across resistor R1 and R2 as shown in FIG. 2. In one embodiment, the controller 202 controls the operations of Q1 and Q2 such that Q1 stays fully on for a period while Q2 stays off. Most of the current passes through the LED string 220 and R1 at that period (marked as String 1 in FIG. 3). Then the controller 202 starts to turn Q2 gradually on and Q1 gradually off. The current starts to shift to the path through the LED string 230 and R2 until Q2 turns fully on and most of current passes though the LED string 230 and R2 (marked as String 2 in FIG. 3). The waveforms shown in FIG. 3 are shown as a function of color temperature. Thus, as more or less contribution is needed from the white LEDs relative to the contribution of the color LEDs, the controller 202 controls the waveforms of the electric currents driving the LED strings 220 and 230.

In one embodiment, a dimmer 203 is coupled to controller 202 as a user control. The dimmer 203 may be controlled by a user to instruct the controller 202 to adjust the light intensity or light color characteristics. In another embodiment, two user controls are provided so that user can control the light intensity and color temperature separately.

The incandescence emission from a conventional incandescent light bulb is a black body radiation. Its emission spectrum conforms to the Planckian locus on the CIE color space. When dimming an incandescent light bulb, customers are used to the color temperature change according to the black body radiation. Therefore, it is desirable to mimic the color temperature change conforming to the Planckian locus when dimming a LED based light source. By controlling the current ratio between white and color LED strings, and bypassing some of the current from one or more color strings, the color temperature of the dimming output light can be fine-tuned to conform to the Planckian locus, mimicking the behavior of a conventional incandescent light bulb under dimming.

The electric circuit 200 does not need any inductors in the circuit. Since there is no switching components or circuitry involved, electromagnetic interference (EMI) is minimized. Noise is also minimized since it is a DC circuitry. The electric circuit 200 can operate from a TRIAC dimmable constant current power supply. The circuit has optimized power efficiency and built-in ability to adjust the intensity and the emitting light color characteristics, such as color temperature and color rendering index. When the linear mode transistors are being adjusted, the circuit does not put heavier-than-normal load onto the power supply.

In some embodiments, the number of parallel LED strings may be more than two. For example, the number of LED strings may be, but not limited to, three, four, or five.

Figure 4:
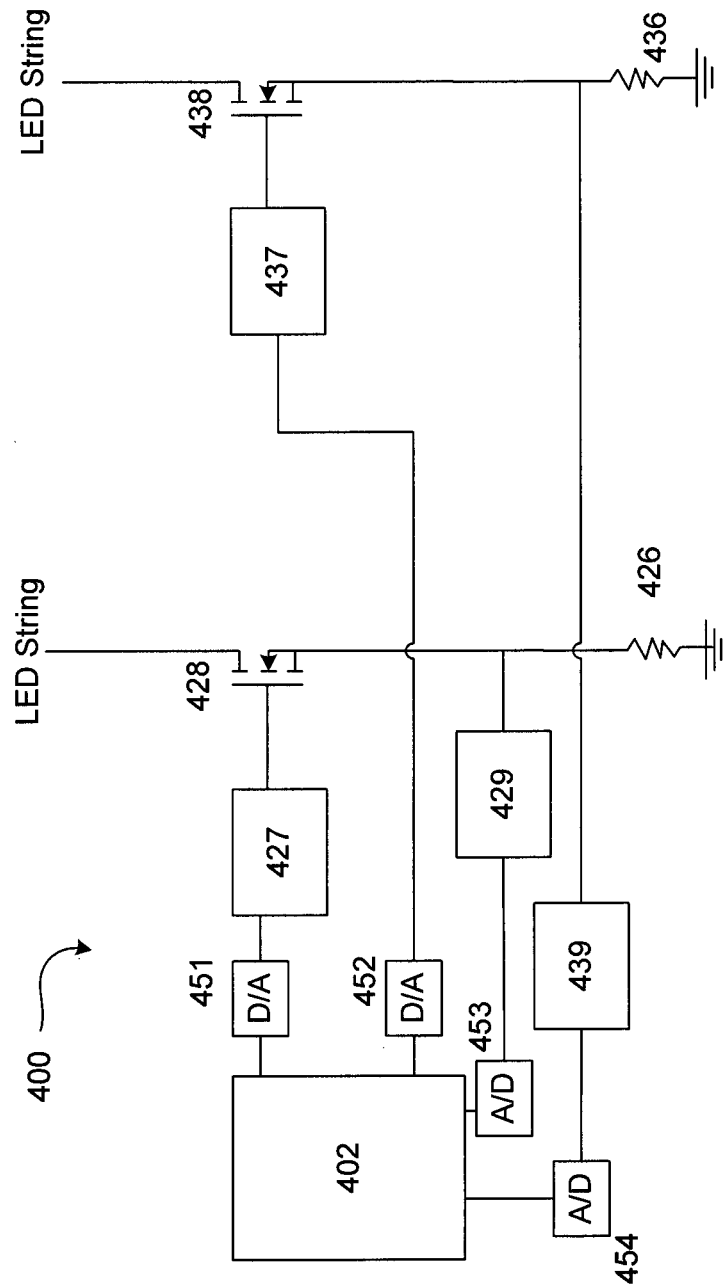
FIG. 4 depicts an electrical circuit for controlling LED strings currents according to one embodiment.

FIG. 4 depicts electrical circuit 400 for controlling LED strings currents according to one embodiment of the disclosure. Linear mode FETs 428 and 438 are the linear mode transistors controlling the current balance between LED strings, similar to Q1 and Q2 shown in FIG. 2. In one embodiment, controller 402 is a processor sending out control signals for the FETs 428 and 438. The control signals are amplified by operational amplifiers (op-amps) 427 and 437. The amplified control signals are fed to control the FETs 428 and 429 operating in their linear modes. Resistors 426 and 436 are coupled between the FETs and ground to measure the current in each LED string. Op-amps 429 and 439 amplify the current measurement signals. The amplified signals are converted by analog-to-digital (ND) converters 453, 454 and then fed back to the processor 402. By measuring the voltages across resistors 426 and 436, processor knows how much current is running down each LED string. Based on the feedback information, processor 402 adjusts the current ratio between LED strings by sending out the control signals. The control signals are converted by digital-to-analog (D/A) converters 451, 452, amplified by op-amps 427, 437, and then fed to FETs 428, 429 controlling the FETs 428 and 429 operating in their linear modes. In one embodiment, FETs are operating according to processor 402, similar in way shown in FIG. 3. In some embodiments, D/A converters 451, 452 share the same component or circuit. In some embodiments, ND converters 453, 454 share the same component or circuit. In some embodiments, D/A converters 451, 452 and ND converters 453, 454 share the same component or circuit.

Figure 6B:
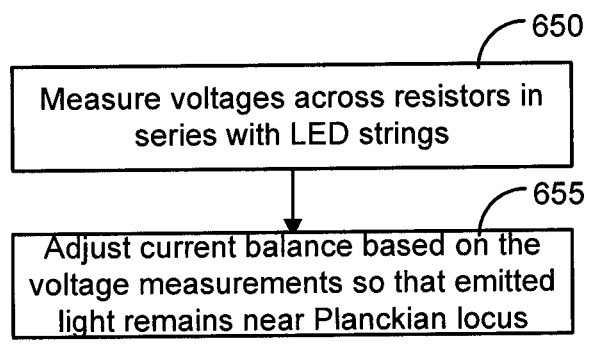
FIG. 6B depicts a flow diagram illustrating an example process of adjusting the string linear mode transistors in the electrical circuit.

FIG. 6B depicts a flow diagram illustrating an example process of adjusting the string linear mode transistors in the electrical circuit. At block 650, the controller measures the voltage across each resistor R1, R2 that is in series with the LED strings. Based on the measured voltages, at block 655 the controller adjusts the current balance between the LED strings so that the emitted light remains near the Planckian locus.

Figure 5:
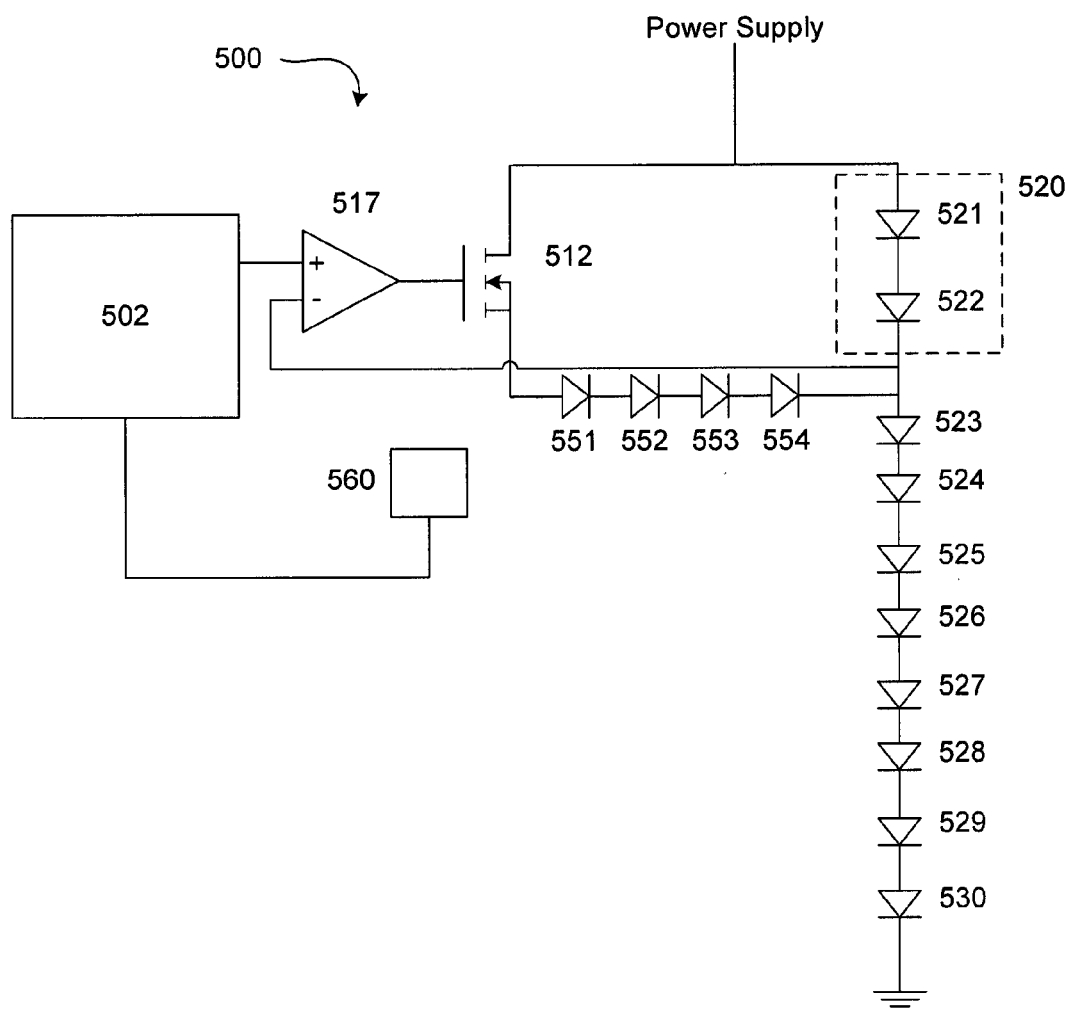
FIG. 5 depicts an electrical circuit for bypassing LED strings currents according to one embodiment.

FIG. 5 depicts electrical circuit 500 for bypassing LED string currents according to one embodiment of the disclosure. The LED string contains LEDs 521, 522, 523, 524, 525, 526, 527, 528, 529 and 530. In one embodiment, red-emitting LEDs 521 and 522 forms a color string 520. In case of adjusting the color characteristics of the output light, current through color string 520 may be adjusted to adjust the red emission contribution to the output spectrum. Processor 502's control signal is amplified by op-amp 517 and fed to FET 512. FET 512 is operating in linear mode to control how much current is bypassed from color string 520. LEDs 521, 522 are dimmed in a way according to the portion of current has been bypassed. Diodes 551, 552, 553 and 554 are introduced to further dissipate the heat generated by the bypass current.

In one embodiment, the LEDs in the LED string are divided into color strings that each color string contains LEDs emitting the same or similar color. Each color string may be complemented a bypass circuit, similar to the one shown in FIG. 5.

In one embodiment, a temperature monitor 560 is coupled to processor 502. Through temperature monitor 560, processor 502 measures the temperature in proximity of heat dissipation location. Then processor 502 feeds out a signal back to the power supply (not shown in FIG. 5), and requests the power supply to reduce current. Thus, the power supply reduces the current it supplies, and the heat dissipation can be reduced accordingly to avoid overheating situations.

Figure 7:
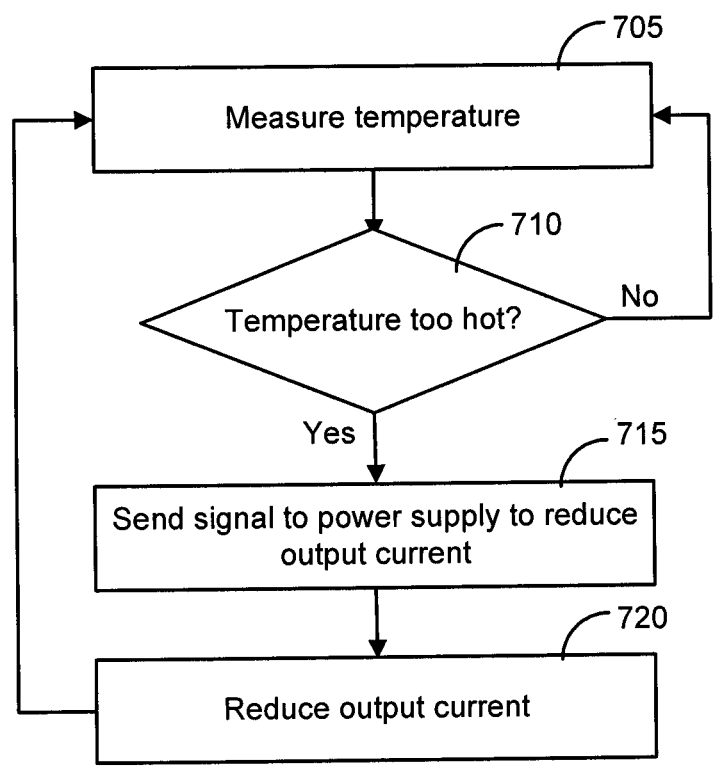
FIG. 7 depicts a flow diagram illustrating an example process of adjusting the power supply for the electrical circuit.

FIG. 7 depicts a flow diagram illustrating an example process of adjusting the power supply for the electrical circuit. At block 705, the system measures the temperature near the strings of LEDs using one or more temperature sensors. Then at decision block 710, the controller determines if the temperature is too hot. The temperature is deemed too hot if it rises above a pre-determined threshold value. If the temperature is not too hot (block 710—No), the system returns to block 705 to monitor the temperature measured by the sensor(s).

If the temperature is too hot (block 710—Yes), at block 715, the controller sends a signal to the power supply to reduce the output current being supplied to the LED strings. Then at block 720, the power supply reduces its output current. The process returns to block 705 to monitor the temperature measured by the sensor(s).

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. An electrical circuit comprising:
   a first LED string including at least one LED;
   a first transistor coupled to the first LED string at a first terminal of the first transistor, the first transistor operating in a linear mode;
   a second LED string including one or more color strings, each of the one or more color strings including at least one LED, the one or more color strings coupled in series, the first LED string and the second LED string coupled in parallel;
   a second transistor coupled to the second LED string at a first terminal of the second transistor, the second transistor operating in a linear mode;
   a bypass transistor coupled to one of the one or more color strings, the bypass transistor operating in a linear mode, a first terminal of the bypass transistor coupled to a first terminal of a corresponding color string, a second terminal of the bypass transistor coupled to a second terminal of the corresponding color string;
   a power supply configured to provide power to the first and second LED strings;
   a controller coupled to transistors including the first transistor, the second transistor and the bypass transistor at gate terminals of the transistors to control gate voltages of the transistors so that the first transistor, the second transistor and the bypass transistor are operating in the linear modes; and
   a digital-to-analog converter and at least one operational amplifier coupled between the controller and a gate terminal of the bypass transistor or coupled between the controller and a gate terminal of one of the first and second transistors.

2. The electrical circuit of claim 1, further comprising a plurality of bypass transistors operating in linear modes, wherein each of the one or more color strings is coupled to a separate bypass transistor of the plurality of bypass transistor, a first terminal of each of the bypass transistors is coupled to a first terminal of the corresponding color string, a second terminal of each of the bypass transistors is coupled to a second terminal of the corresponding color string.

3. The electrical circuit of claim 2, wherein each bypass transistor of the plurality of bypass transistors is operative to bypass at least a portion of an electric current from the corresponding color string.

4. The electrical circuit of claim 1, wherein the first and second transistors are operative to adjust a ratio of electric currents passing through the first and second LED strings.

5. The electrical circuit of claim 1, wherein the controller is operative to keep at least one of the first and second transistors on during operation of the electric circuit.

6. The electrical circuit of claim 1, further comprising a string bypass transistor operating in a linear mode, wherein the string bypass transistor is coupled to the first LED string, a first terminal of the string bypass transistor is coupled to a first terminal of the first LED string, a second terminal of the string bypass transistor is coupled to a second terminal of the first LED string.

7. The electrical circuit of claim 1, further comprising a first resistor and a second resistor; wherein a first terminal of the first resistor is coupled to a second terminal of the first transistor, the first resistor connects to the ground at a second terminal of the first resistor, a first terminal of the second resistor is coupled to a second terminal of the second transistor, the second resistor connects to the ground at a second terminal of the second resistor.

8. The electrical circuit of claim 7, wherein the controller is coupled to the first terminal of the first resistor for measuring a voltage across the first resistor, and the controller is coupled to the first terminal of the second resistor for measuring a voltage across the second resistor.

9. The electrical circuit of claim 8, further comprising at least one operational amplifier and an analog-to-digital converter coupled between the controller and the first terminal of one of the first and second resistors.

10. The electrical circuit of claim 1, wherein the power supply is a current source.

11. The electrical circuit of claim 10, wherein the power supply is a user-controllable power supply.

12. The electrical circuit of claim 11, wherein the controller is coupled to the power supply to adjust an output current of the power supply.

13. The electrical circuit of claim 1, further comprising a temperature monitor coupled to the controller.

14. The electrical circuit of claim 1, further comprising a dimming device coupled to the controller, wherein the dimming device is operative to be controlled by a user to send a signal to the controller indicating an intended output light intensity.

15. The electrical circuit of claim 1, further comprising a color adjusting device coupled to the controller, wherein the color adjusting device is operative to be controlled by a user to send a signal to the controller indicating an intended output light color.

16. The electrical circuit of claim 1, further comprising:
a third LED string including at least one LED, the first LED string, the second LED string and the third LED string coupled in parallel;
a third transistor coupled to the third LED string at a first terminal of the third transistor, the third transistor operating in a linear mode, the controller coupled to the third transistor at a gate terminal of the third transistor to control a gate voltage of the third transistor so that the third transistor is operating in a linear mode.

17. The electrical circuit of claim 1, wherein the LEDs of the first and second LED strings are arranged so that a total voltage drop of the first LED string is substantially close to a total voltage drop of the second LED string.

18. The electrical circuit of claim 1, wherein the LEDs are arranged so that a color temperature of an output light is from about 3500 Kelvin to about 5500 Kelvin when all of the linear mode transistors are off.

19. The electrical circuit of claim 1, further comprising one or more diodes coupled between a second terminal of the bypass transistor and a second terminal of the corresponding color string to dissipate a portion of heat from a bypassed current.

20. An electrical circuit comprising:
a first LED string including at least one LED;
a first transistor coupled to the first LED string at a first terminal of the first transistor, the first transistor operating in a linear mode;
a second LED string including a first color string, a second color string and a third color string; the first, second and third color strings coupled in series, the first LED string and the second LED string coupled in parallel;
a second transistor coupled to the second LED string at a first terminal of the second transistor, the second transistor operating in a linear mode;
a first bypass transistor coupled to the first color string, the first bypass transistor operating in a linear mode, a first terminal of the first bypass transistor coupled to a first terminal of the first color string, a second terminal of the first bypass transistor coupled to a second terminal of the first color string;
a second bypass transistor coupled to the second color string, the second bypass transistor operating in a linear mode, a first terminal of the second bypass transistor coupled to a first terminal of the second color string, a second terminal of the second bypass transistor coupled to a second terminal of the second color string;
a third bypass transistor coupled to the third color string, the third bypass transistor operating in a linear mode, a first terminal of the third bypass transistor coupled to a first terminal of the third color string, a second terminal of the third bypass transistor coupled to a second terminal of the third color string;
a controllable power supply configured to provide power to the first and second LED strings;
a controller coupled to transistors including the first and second transistors and the first, second and third bypass transistors at gate terminals of the transistors to control gate voltages of the transistors so that the first and second transistors and the first, second and third bypass transistors are operating in the linear modes; and
a digital-to-analog converter and at least one operational amplifier coupled between the controller and a gate terminal of one of the first, second, and third bypass transistors or coupled between the controller and a gate terminal of one of the first and second transistors.

21. The electrical circuit of claim 20, wherein the first color sting comprises at least one red LED, the second color string comprises at least one amber LED, and the third color string comprises at least one blue LED.

22. The electrical circuit of claim 20, wherein the second LED string further includes a fourth color string, the electrical circuit further comprises a fourth bypass transistor coupled to the fourth color string, the fourth bypass transistor is operating in a linear mode, a first terminal of the fourth bypass transistor is coupled to a first terminal of the fourth color string, and a second terminal of the fourth bypass transistor is coupled to a second terminal of the fourth color string.

23. The electrical circuit of claim 22, wherein the fourth color string comprises at least one cyan LED.

24. A method of changing color temperature of an emitting light using an LED electrical circuit, the LED electrical circuit comprising:
a first LED string including at least one LED;
a first transistor coupled to the first LED string at a first terminal of the first transistor, the first transistor operating in a linear mode;
a second LED string including one or more color strings, each of the one or more color strings including at least one LED, the one or more color strings coupled in series, the first LED string and the second LED string coupled in parallel;
a second transistor coupled to the second LED string at a first terminal of the second transistor, the second transistor operating in a linear mode;
a bypass transistor coupled to one of the one or more color strings, the bypass transistor operating in a linear mode, a first terminal of the bypass transistor coupled to a first terminal of the corresponding color string, a second terminal of the bypass transistor coupled to a second terminal of the corresponding color string;
a controller; and
a digital-to-analog converter and at least one operational amplifier coupled between the controller and a gate terminal of the bypass transistor, the first transistor, or the second transistor;
the method comprising:
adjusting the bypass transistor to bypass at least a portion of an electric current from the corresponding color string;
controlling the first and second transistors to adjust a ratio of electric currents passing through the first and second LED strings so that the light intensity of the emitting light substantially persists, wherein the controlling includes converting a signal from the controller through the digital-to-analog converter and the operational amplifier.

25. The method of claim 24, wherein the adjusting the bypass transistor further comprises adjusting a gate voltage of the bypass transistor.

26. The method of claim 24, wherein the controlling the first and second transistors further comprises controlling gate voltages of the first and second transistors.

27. A method of dimming an emitting light using an LED electrical circuit, the LED electrical circuit comprising:
a first LED string including at least one LED;
a first transistor coupled to the first LED string at a first terminal of the first transistor, the first transistor operating in a linear mode;
a second LED string including one or more color strings, each of the one or more color strings including at least one LED, the one or more color strings coupled in series, the first LED string and the second LED string coupled in parallel;
a second transistor coupled to the second LED string at a first terminal of the second transistor, the second transistor operating in a linear mode;
a plurality of bypass transistors operating in linear modes, wherein each of the one or more color strings is coupled to a separate bypass transistor of the plurality of bypass transistor, a first terminal of each of the bypass transistors is coupled to a first terminal of the corresponding color string, a second terminal of each of the bypass transistors is coupled to a second terminal of the corresponding color string; and
a controller; and
a digital-to-analog converter and at least one operational amplifier coupled between the controller and a gate terminal of one of the bypass transistors, the first transistor, and the second transistor;
the method comprising:
adjusting one or more of the bypass transistors to bypass at least a portion of an electric current from the corresponding color string;
controlling the first and second transistors to adjust a ratio of electric currents passing through the first and second LED strings so that the light intensity of the emitting light decreases while the color temperature of the emitting light substantially conforms to the Planckian locus, wherein the controlling includes converting a signal from the controller through the digital-to-analog converter and the operational amplifier.

28. The method of claim 27, wherein the adjusting one or more of the bypass transistors further comprises adjusting gate voltages of the one or more of the bypass transistors.

29. The method of claim 27, wherein the controlling the first and second transistors further comprises controlling gate voltages of the first and second transistors.

30. An electrical circuit comprising:
a first LED string including at least one LED;
a first transistor coupled to the first LED string at a first terminal of the first transistor, the first transistor capable of operating in a linear mode;
a second LED string including one or more color strings, each of the one or more color strings including at least one LED, the one or more color strings coupled in series, the first LED string and the second LED string coupled in parallel;
a second transistor coupled to the second LED string at a first terminal of the second transistor, the second transistor capable of operating in a linear mode;
a bypass transistor coupled to one of the one or more color strings, the bypass transistor capable of operating in a linear mode, a first terminal of the bypass transistor coupled to a first terminal of a corresponding color string, a second terminal of the bypass transistor coupled to a second terminal of the corresponding color string; and
a digital-to-analog converter and at least one operational amplifier coupled to a gate terminal of the bypass transistor or coupled to a gate terminal of one of the first and second transistors.

31. The electrical circuit of claim 30, further comprising a plurality of bypass transistors capable of operating in linear modes, wherein each of the one or more color strings is coupled to a separate bypass transistor of the plurality of bypass transistor, a first terminal of each of the bypass transistors is coupled to a first terminal of the corresponding color string, a second terminal of each of the bypass transistors is coupled to a second terminal of the corresponding color string.

32. The electrical circuit of claim 31, wherein each bypass transistor of the plurality of bypass transistors is operative to bypass at least a portion of an electric current from the corresponding color string.

33. The electrical circuit of claim 30, wherein the first and second transistors are operative to adjust a ratio of electric currents passing through the first and second LED strings.

34. The electrical circuit of claim 30, wherein at least one of the first and second transistors is configured to be on during operation of the electric circuit.

35. The electrical circuit of claim 30, further comprising a string bypass transistor capable of operating in a linear mode, wherein the string bypass transistor is coupled to the first LED string, a first terminal of the string bypass transistor is coupled to a first terminal of the first LED string, a second terminal of the string bypass transistor is coupled to a second terminal of the first LED string.

36. The electrical circuit of claim 30, further comprising a first resistor and a second resistor; wherein a first terminal of the first resistor is coupled to a second terminal of the first transistor, the first resistor connects to the ground at a second terminal of the first resistor, a first terminal of the second resistor is coupled to a second terminal of the second transistor, the second resistor connects to the ground at a second terminal of the second resistor.

37. The electrical circuit of claim 36, further comprising at least one operational amplifier and an analog-to-digital converter coupled to the first terminal of one of the first and second resistors.

38. The electrical circuit of claim 30, wherein the first and second LED strings are configured to receive power from a current source.

39. The electrical circuit of claim 38, wherein the first and second LED strings are configured to receive power from a user-controllable power supply.

40. The electrical circuit of claim 30, further comprising:
a third LED string including at least one LED, the first LED string, the second LED string and the third LED string coupled in parallel;
a third transistor coupled to the third LED string at a first terminal of the third transistor, the third transistor capable of operating in a linear mode.

41. The electrical circuit of claim 30, wherein the LEDs of the first and second LED strings are arranged so that a total voltage drop of the first LED string is substantially close to a total voltage drop of the second LED string during operation of the electrical circuit.

42. The electrical circuit of claim 30, wherein the LEDs are arranged so that a color temperature of an output light is from about 3500 Kelvin to about 5500 Kelvin when all of the linear mode transistors are off.

43. The electrical circuit of claim 30, further comprising one or more diodes coupled between a second terminal of the bypass transistor and a second terminal of the corresponding color string to dissipate a portion of heat from a bypassed current.

44. An electrical circuit comprising:
a first LED string including at least one LED;
a first transistor coupled to the first LED string at a first terminal of the first transistor, the first transistor capable of operating in a linear mode;
a second LED string including a first color string, a second color string and a third color string; the first, second and third color strings coupled in series, the first LED string and the second LED string coupled in parallel;
a second transistor coupled to the second LED string at a first terminal of the second transistor, the second transistor capable of operating in a linear mode;
a first bypass transistor coupled to the first color string, the first bypass transistor capable of operating in a linear mode, a first terminal of the first bypass transistor coupled to a first terminal of the first color string, a second terminal of the first bypass transistor coupled to a second terminal of the first color string;
a second bypass transistor coupled to the second color string, the second bypass transistor capable of operating in a linear mode, a first terminal of the second bypass transistor coupled to a first terminal of the second color string, a second terminal of the second bypass transistor coupled to a second terminal of the second color string; and
a third bypass transistor coupled to the third color string, the third bypass transistor capable of operating in a linear mode, a first terminal of the third bypass transistor coupled to a first terminal of the third color string, a second terminal of the third bypass transistor coupled to a second terminal of the third color string; and
a digital-to-analog converter and at least one operational amplifier coupled between the controller and a gate terminal of one of the first, second, and third bypass transistors or coupled between the controller and a gate terminal of one of the first and second transistors.

45. The electrical circuit of claim 44, wherein the first color sting comprises at least one red LED, the second color string comprises at least one amber LED, and the third color string comprises at least one blue LED.

46. The electrical circuit of claim 44, wherein the second LED string further includes a fourth color string, the electrical circuit further comprises a fourth bypass transistor coupled to the fourth color string, the fourth bypass transistor is capable of operating in a linear mode, a first terminal of the fourth bypass transistor is coupled to a first terminal of the fourth color string, and a second terminal of the fourth bypass transistor is coupled to a second terminal of the fourth color string.

47. The electrical circuit of claim 46, wherein the fourth color string comprises at least one cyan LED.

* * * * *